(12) United States Patent
Ishiguro et al.

(10) Patent No.: US 6,689,017 B2
(45) Date of Patent: Feb. 10, 2004

(54) SHIFT CONTROL APPARATUS FOR AN AUTOMATIC TRANSMISSION AND SHIFT CONTROL METHOD FOR AN AUTOMATIC TRANSMISSION

(75) Inventors: Toshiaki Ishiguro, Chita (JP); Toshinori Murahashi, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/983,903

(22) Filed: Oct. 26, 2001

(65) Prior Publication Data

US 2002/0058569 A1 May 16, 2002

(30) Foreign Application Priority Data

Oct. 26, 2000 (JP) ........................................ 2000-327554

(51) Int. Cl.$^7$ ............................................... F16H 59/48
(52) U.S. Cl. ....................................... 477/120; 477/905
(58) Field of Search ............................... 477/904, 905, 477/115, 120, 121, 98; 701/55, 56

(56) References Cited

U.S. PATENT DOCUMENTS

| | | | | |
|---|---|---|---|---|
| 4,889,015 A | * | 12/1989 | Kondo | .......................... 74/866 |
| 5,182,710 A | * | 1/1993 | Tomisawa | ................. 74/866 X |
| 5,556,349 A | * | 9/1996 | Ishii et al. | ................. 477/97 X |
| 5,941,793 A | * | 8/1999 | Ito et al. | ...................... 477/120 |
| 5,961,420 A | * | 10/1999 | Darnell | ........................ 477/120 |
| 6,295,498 B1 | * | 9/2001 | Gleason et al. | ......... 477/121 X |

FOREIGN PATENT DOCUMENTS

| | | | | |
|---|---|---|---|---|
| EP | 0574965 | * | 12/1993 | ................. 477/905 |
| JP | 63-212136 | * | 9/1988 | ................. 477/905 |
| JP | 6-241304 | * | 8/1994 | ................. 477/905 |
| JP | 7-127720 A | | 5/1995 | |

* cited by examiner

Primary Examiner—Roger Pang
(74) Attorney, Agent, or Firm—Burns, Doane, Swecker & Mathis, LLP

(57) ABSTRACT

A control apparatus effects shift control of an automatic transmission to produce gear stage shifting using a first shift pattern in which gear stage shifting is based on vehicle speed and throttle opening and a second shift pattern in which gear stage shifting is based on the vehicle speed and a road condition, with gear stage shifting being based on the second shift pattern under vehicle deceleration. The gear stage shift is based on the second shift pattern without shifting from a first gear stage to a second gear stage, which is a higher-speed gear stage than the first gear stage, when the vehicle driving condition changes from a condition crossing a shift line which commands a shift from the first to the second gear stage on the first shift pattern to a condition switching from the first shift pattern to the second shift pattern according to a prescribed condition.

8 Claims, 4 Drawing Sheets

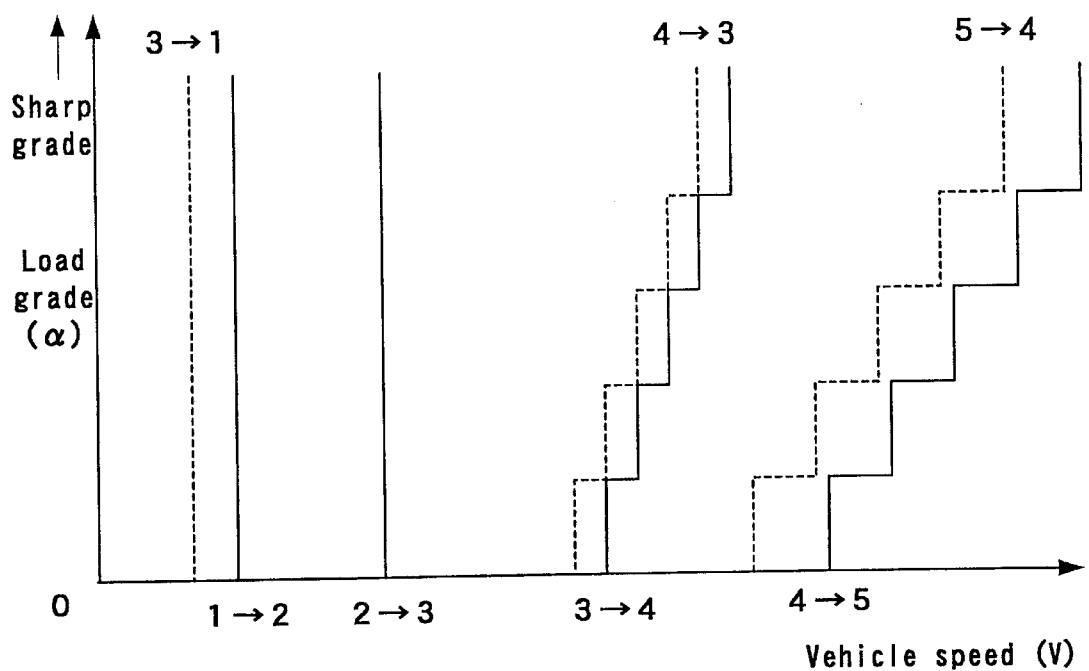

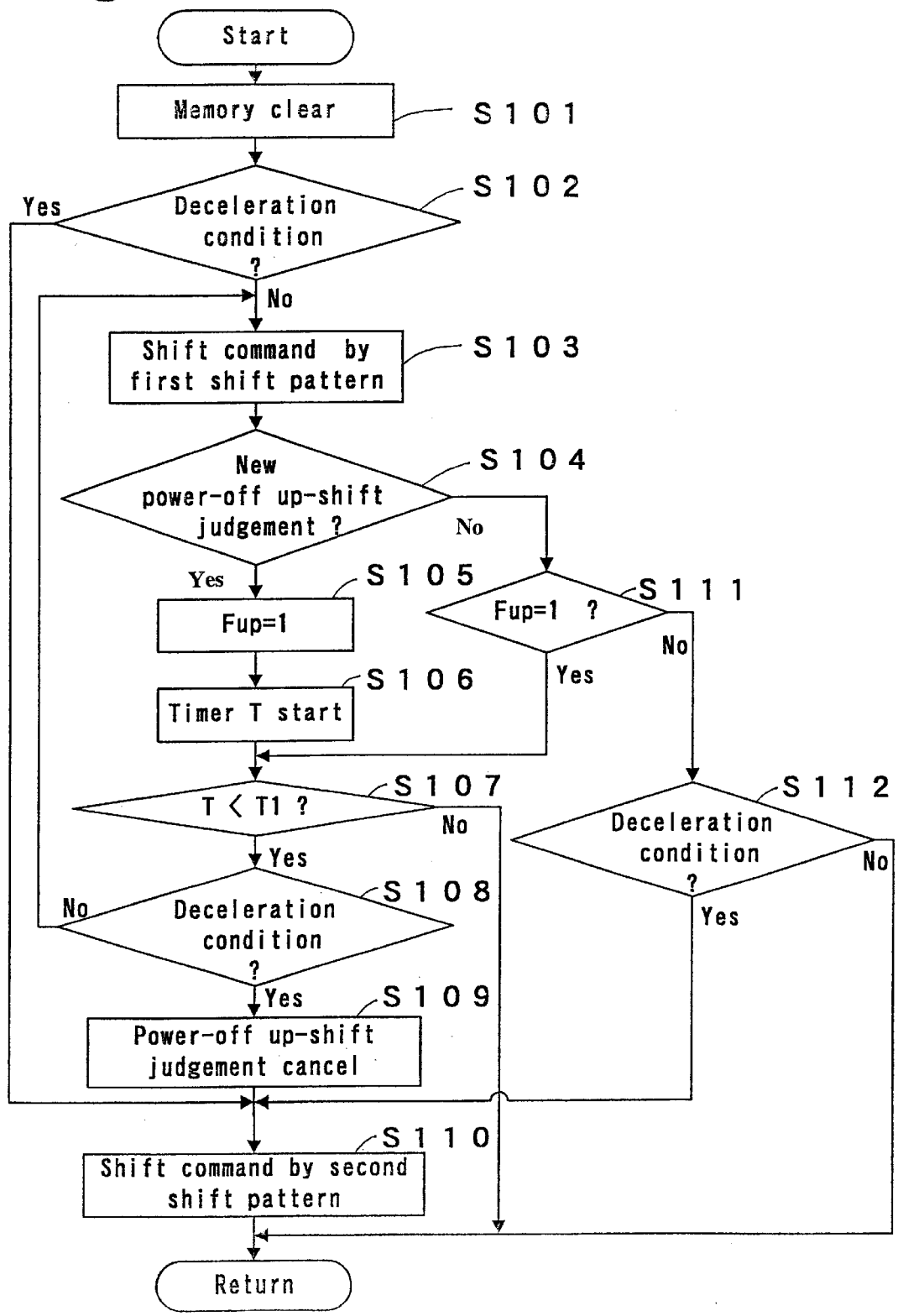

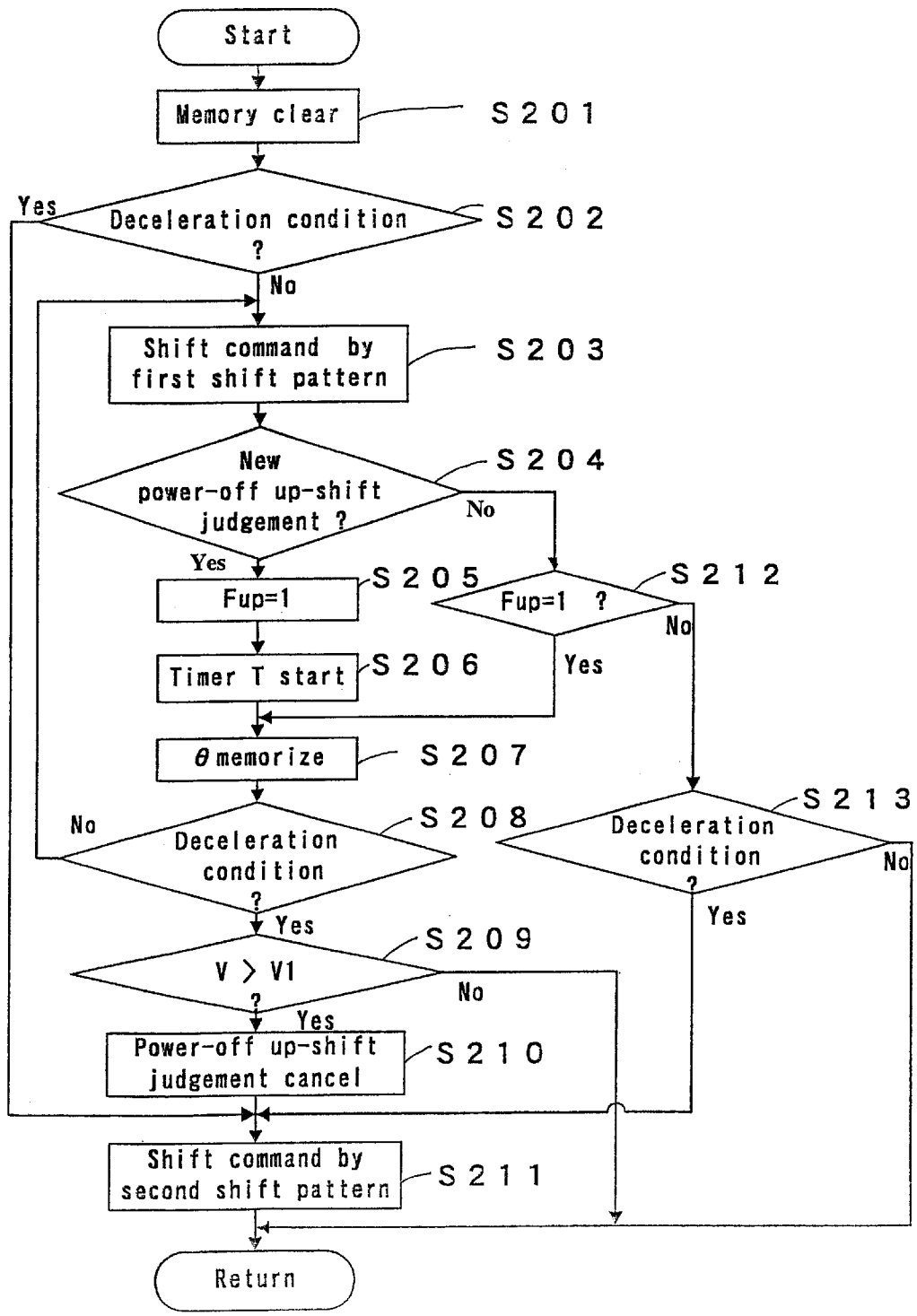

SHIFT CONTROL APPARATUS FOR AN AUTOMATIC TRANSMISSION AND SHIFT CONTROL METHOD FOR AN AUTOMATIC TRANSMISSION

This application is based on and claims priority under 35 U.S.C. §119 with respect to Japanese Patent Application 2000 327554 filed on Oct. 26, 2000, the entire content of which is incorporated herein by reference.

FIELD OF THE INVENTION

This invention generally relates to an automatic transmission. More particularly, the present invention pertains to a shift control apparatus and method for controlling an automatic transmission to shift a gear stage based on at least two shift patterns, one involving shifting the gear stage based on vehicle speed and throttle opening and the other involving shifting the gear stage based on vehicle speed and road condition.

BACKGROUND OF THE INVENTION

A known shift control apparatus for an automatic transmission is disclosed in Japanese Patent Laid-Open Publication No. Hei 07-127720. This published application discloses that the shift control apparatus switches between a first shift pattern involving shifting gears based on vehicle speed and throttle opening and a second shift pattern involving shifting gears based on road grade and vehicle speed according to the throttle opening, the range of the shift lever, the gear stage, and the vehicle speed. The shift control apparatus controls the automatic transmission to shift the gear stage based on the second shift pattern when the apparatus judges that the vehicle condition is in a deceleration area. For example, the shift control device judges that the vehicle condition is in the deceleration area when the shift lever is in the D (drive) range, the gear stage is larger than the 2nd gear stage, the throttle opening is less than a predetermined value, and the vehicle speed is larger than a predetermined value.

However, with the shift control apparatus described in the above-mentioned published application, when the apparatus judges for example that vehicle is in the deceleration area after the apparatus has shifted from the 3rd gear stage to the 4th gear stage based on the first shift pattern, the automatic transmission is shifted to the 3rd gear stage again based on the second shift pattern in accordance with the vehicle speed and road grade conditions. That is, the vehicle is shifted down to the 3rd gear stage quickly after the vehicle is shifted up from 3rd gear stage to 4th gear stage in a short time period. The shifting to the same gear stage (3rd gear stage) is thus repeated in a short time period. Therefore, the automatic transmission hunts through repeated shifting, and this causes a problem with respect to a deterioration in the shift feeling.

A need thus exists for a shift control apparatus and method for improving the shift feeling when the shift control apparatus switches between at least two shift patterns.

SUMMARY OF THE INVENTION

One aspect of the present invention involves a control apparatus for effecting shift control of an automatic transmission for shifting a gear stage of the automatic transmission based on one of a first shift pattern in which gear stage shifting is based on vehicle speed and throttle opening and a second shift pattern in which gear stage shifting is based on the vehicle speed and a road condition, and with the gear stage shifting being based on the second shift pattern when the vehicle driving condition is in a deceleration condition. A shift control apparatus controls the automatic transmission to shift the gear stage based on the second shift pattern without shifting from a first gear stage to a second gear stage which is higher-speed gear stage than the first gear stage when the vehicle driving condition changes from a condition crossing a shift line which commands a shift from the first gear stage to the second gear stage on the first shift pattern to a condition switching from the first shift pattern to the second shift pattern according to a prescribed condition.

The gear stage is shifted based on the second shift pattern without shifting from the first gear stage to the second gear stage when the vehicle driving condition changes from the condition crossing the shift line on the first shift pattern to the condition switching from the first shift pattern to the second shift pattern according to the prescribed condition. For example, when the vehicle driving condition is changed from the first shift pattern to the second shift pattern by an operation of the driver, even if the vehicle driving condition crosses over the shift line changing from the first gear stage to the second gear stage, the gear stage of the automatic transmission is shifted based on the second shift pattern without being shifted to the second gear stage. The gear stage of the automatic transmission is thus not shifted to the high-speed gear stage (the second gear stage) repeatedly. It is thus possible to decrease extra and repeated shifting. Hunting of the automatic transmission is thus decreased and the shift feeling is improved.

In the present invention, the prescribed condition is the vehicle deceleration condition. More specifically, the prescribed condition is the condition in which the time from the condition crossing the shift line which commands the shift from the first gear stage to the second gear stage on the first shift pattern until the condition switching from the first shift pattern to the second shift pattern is shorter than a predetermined time. The prescribed condition can also be the condition in which the rate of the throttle opening when the vehicle driving condition changes from the condition crossing the shift line which commands the shift from the first gear stage to the second gear stage on the first shift pattern to the condition switching from the first shift pattern to the second shift pattern is larger than a predetermined rate. The control apparatus is thus better able to control the automatic transmission according to the driver's intention.

According to another aspect of the present invention, a shift control method for an automatic transmission is designed to shift a gear stage of the automatic transmission according to one of a first shift pattern in which gear stage shifting is based on vehicle speed and a throttle opening and a second shift pattern in which gear stage shifting is based on the vehicle speed and a road condition, with the gear stage shifting being based on the second shift pattern when the vehicle driving condition is in a deceleration condition. The method involves judging on the basis of the vehicle driving condition whether to perform gear stage shifting according to the first shift pattern or the second shift pattern, controlling the automatic transmission to shift the gear stage according to the first shift pattern when it is judged on the basis of the vehicle driving condition that gear stage shifting is to be performed according to the first shift pattern, and judging whether the vehicle driving condition changes from a condition crossing a shift line which commands a shift from the first gear stage to the second gear stage on the first shift pattern to a condition switching from the first shift pattern to the second shift pattern. The automatic transmission is then controlled to shift the gear stage based on the second shift pattern without shifting from the first gear stage to the second gear stage when the vehicle driving condition changes to a condition in which gear stage shifting is performed according to the second shift pattern within a predetermined time after the vehicle driving condition crossed over the shift line.

Another aspect of the present invention relates to a shift control method for an automatic transmission that is designed to shift a gear stage of the automatic transmission according to one of a first shift pattern in which gear stage shifting is based on vehicle speed and a throttle opening and a second shift pattern in which gear stage shifting is based on the vehicle speed and a road condition, with the gear stage shifting being based on the second shift pattern when the vehicle driving condition is in a deceleration condition. The method includes judging on the basis of the vehicle driving condition whether to perform gear stage shifting according to the first shift pattern or the second shift pattern, controlling the automatic transmission to shift the gear stage according to the first shift pattern when it is judged on the basis of the vehicle driving condition that gear stage shifting is to be performed according to the first shift pattern, and judging whether the vehicle driving condition changes from a condition crossing a shift line which commands a shift from the first gear stage to the second gear stage on the first shift pattern to a condition switching from the first shift pattern to the second shift pattern. The automatic transmission is then controlled to shift the gear stage based on the second shift pattern without shifting from the first gear stage to the second gear stage when a rate of the throttle opening is larger than a predetermined rate at a time when the vehicle driving condition changes to a condition in which gear stage shifting is performed according the second shift pattern within a predetermined time after the vehicle driving condition crossed over the shift line.

The automatic transmission is controlled to shift the gear stage based on the second shift pattern when the throttle opening is less than a predetermined opening. The automatic transmission can thus be more reliably controlled according to the driver's intention.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 3 is a graph of the second shift pattern according to the present invention.

FIG. 4 is a flowchart showing the shift control method according to a first embodiment of a present invention.

FIG. 5 is a flowchart showing the shift control method according to a second embodiment of a present invention.

DETAILED DESCRIPTION OF THE INVENTION

Figure 1:
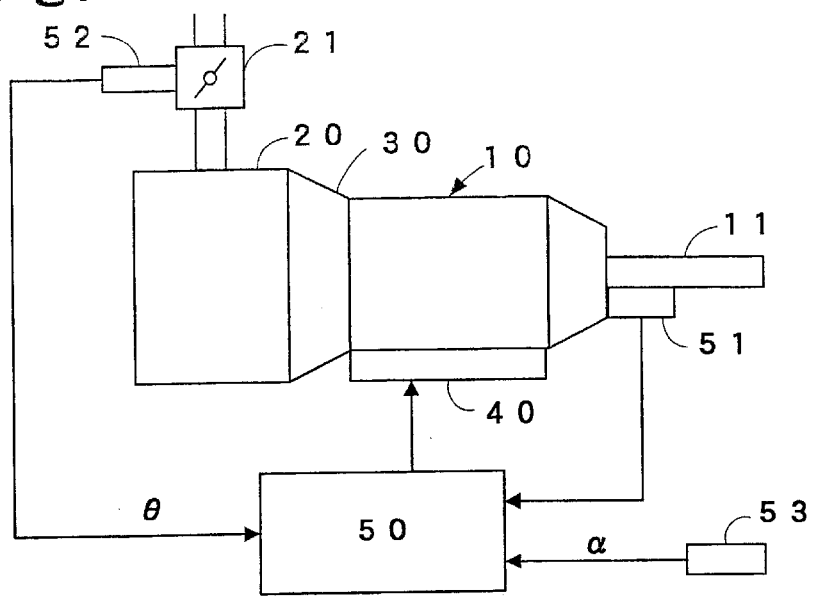
FIG. 1 is a schematic illustration of a controller and a peripheral apparatus adopted in an automatic transmission shift control apparatus according to the present invention.

Referring initially to an automatic transmission 10 includes a planetary gear type transmission with forward 1st–5th gear stages, an engine 20, a torque converter 30 transmitting a driving force from the engine 20 to the automatic transmission 10, a hydraulic control apparatus 40 engaging or disengaging with friction elements in the automatic transmission 10 to establish a required gear stage, and a controller or controlling apparatus 50 for controlling the operation of the engine 20 and for effecting shift control of the automatic transmission 10 based on several inputted signals of the vehicle. The controller 50 includes a shift control apparatus which controls the automatic transmission 10 to shift the gear stage. In addition, a plurality of electromagnetic valves (solenoid valves) are disposed in the hydraulic control apparatus 40. The controller 50 controls hydraulic pressure supplied to the friction elements by energizing the electromagnetic valves to thereby establish a requested or desired gear stage.

The controller 50 is inputted with signals from several sensors that constitute condition signals of the vehicle indicating various conditions associated with the vehicle. These sensors include an output shaft speed sensor 51 for detecting the rotational speed of the output shaft 11 of the automatic transmission 10, a throttle sensor 52 for detecting the throttle opening $\theta$ of a throttle valve 21, and a road grade sensor 53 for detecting the road grade $\alpha$. The throttle opening $\theta$ is determined according to the depression amount of the accelerator pedal resulting from the operation force applied by the driver.

Figure 2:
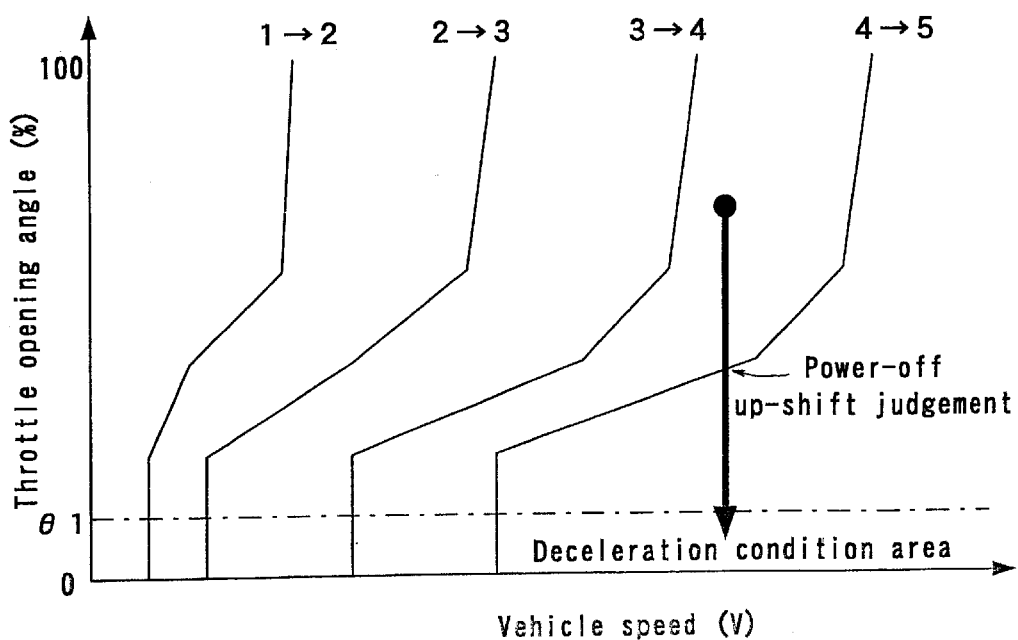
FIG. 2 is a graph of the first shift pattern according to the present invention.

The controller 50 includes a memory in which are memorized two shift patterns. The two shift patterns include a first shift pattern shown in FIG. 2 in which gear stage shifting is based on the vehicle speed V and the throttle opening $\theta$, and a second shift pattern shown in FIG. 3 in which gear stage shifting is based on a road condition (e.g., the road grade $\alpha$) and the vehicle speed V when the vehicle is decelerating. In FIG. 2, an area in which the throttle opening is less than a predetermined throttle opening $\theta 1$ (e.g., the area below the one dotted chain line) defines a deceleration condition area in this embodiment. However, it is to be understood that the downshift shift line is omitted in FIG. 2.

In FIG. 3, an up-shift line is shown by the solid lines, and the downshift line is shown by the phantom lines or dotted lines. In the first embodiment, the vehicle speed V is calculated by the controller 50 based on the output of the output shaft speed sensor 51 of the automatic transmission 10.

FIG. 4 illustrates the shift control executed by the controller 50 or a control device of the automatic transmission 10. This control is executed at a predetermined time interval. In step S101 of FIG. 4, the memory in the controller 50 is cleared and initialization is executed. The program then proceeds to step S102 where the controller 50 judges whether or not the vehicle driving condition is a deceleration condition (e.g., a predetermined deceleration condition). In the first embodiment, the deceleration condition is defined by the throttle opening $\theta$ being less than the predetermined opening angle $\theta 1$. The throttle opening $\theta$ is thus compared with the predetermined throttle opening $\theta 1$ at step S102 to determine if the vehicle driving condition is a deceleration condition. When it is determined in step S102 that the vehicle driving condition is not the deceleration condition (i.e., the throttle opening $\theta > \theta 1$, e.g. an acceleration condition), the program proceeds to step S103. Here, a shift command is outputted by the controller 50 according to the first shift pattern shown in FIG. 2. When it is determined in step S102 that the vehicle driving condition is the deceleration condition, the program proceeds to step S110 and the shift command is outputted by the controller 50 according to the second shift pattern shown in FIG. 3.

After executing step S103, the controller 50 judges in step S104 whether or not the new power-off up-shift judgment is performed. The power-off up-shift judgment is defined when the throttle opening θ crosses over a shift line changing the gear stage to a high-speed gear stage, such as a shift from the first gear stage to the second gear stage (e.g., 4th→5th, 3rd→4th, 2nd→3rd, 1st→2nd) when the throttle opening θ is decreased by the OFF condition of the accelerator pedal operation. Power-off up-shift is the condition in which the driver operates the accelerator to decrease the throttle opening, with the vehicle driving condition expressed by the relationship between the throttle opening and the vehicle speed changing so as to cross the up-shift line on the shift map shown in FIG. 2. Thus, in the power-off up-shift judgment, the controller 50 judges whether the vehicle condition is the power-off up-shift condition. For reference, in FIG. 2, after the power-off up-shift judgment for shifting from the 4th gear stage to the 5th gear stage is performed, FIG. 2 shows a change of the throttle opening θ when the vehicle driving condition is shifted to the deceleration condition area.

When it is determined in step S104 that the power-off up-shift judgment such as this is performed, the program proceeds to step S105. Here, a flag Fup is set (Fup=1). Then, the program proceeds to step S106 where a timer T is started. Next, in step S107, the controller 50 judges whether or not the timer T is less than a predetermined time T1. In this case, the timer T shows the time from establishment or setting of the flag Fup (Fup=1) at step S105 to the present time. When the timer T is less than the predetermined time T1, the program proceeds to step S108 and the controller 50 determines whether or not the vehicle driving condition is the deceleration condition. If the controller 50 judges that the vehicle driving condition is the deceleration condition, the power-off up-shift judgment is canceled and the power-off up-shift judgment is stopped or canceled at step S109. The routine then proceeds to step S110 at which the shift command is outputted by the controller 50 according to the second shift pattern shown in FIG. 3. Then, electromagnetic valves in the hydraulic control apparatus 40 are controlled to establish the gear stage according to the outputted shift command at step S110 by the control program.

In the flowchart of FIG. 4, the process from step S101 to step S107 is executed, and when the vehicle driving condition is not the deceleration condition at step S108, the program proceeds to steps S103 and S104. At step S104, the controller 50 once again judges whether or not a new power-off up-shift judgment was performed. When it is determined at step S104 that a new power-off up-shift judgment was performed, the controller 50 proceeds to step 105, a new flag Fup is set at step 105, and the timer is started at step 106. On the other hand, when it is determined at step S104 that the new power-off up-shift judgment was not performed, the program proceeds to step 111. At step S111, the controller 50 judges whether or not the flag Fup is set (Fup=1). At this time, the program proceeds to step 107 as the flag Fup is already set. When the timer T is less than the predetermined time T1, the program proceeds to step 108 and the controller 50 judges whether or not the vehicle driving condition is the deceleration condition. When it is determined in step S108 that the vehicle driving condition is the deceleration condition, the program proceeds to steps S109, S110. However, when the vehicle driving condition is not the deceleration condition, the program returns to step S103. If the program returns to step S103, the program repeats the process from step S103 to step S108, When the timer T is more than the predetermined time T1 at step S107, the program is finished. In this case, the electromagnetic valves in the hydraulic control apparatus 40 are controlled to establish the gear stage based on the first shift pattern as the vehicle driving condition is not the deceleration condition.

Further, when it is initially determined at step S104 that the power-off up-shift judgment is not performed yet, the program proceeds to step S112 from step S111 because the flag Fup is not yet set at step S111. In step S112, the controller 50 judges whether or not the vehicle driving condition is the deceleration condition. When it is determined in step S112 that the vehicle driving condition is the deceleration condition, the controller 50 outputs a shift command according to the second shift pattern for the respective electromagnetic valves at step 110. On the other hand, when the vehicle driving condition is not the deceleration condition, this shift control is finished, and the controller controls electromagnetic valves in the hydraulic control apparatus 40 to establish the gear stage based on the first shift pattern.

According to the above-described method involving steps 104–110 in the first embodiment, when the vehicle driving condition shifts to the second shift pattern within the predetermined time T1 after the power-off up-shift judgment was performed on the first shift pattern, the controller 50 outputs the shift command based on the second shift pattern after canceling the power-off up-shift judgment. Thus, the automatic transmission 10 does not carry out a gearshift shifting to a high-speed stage side (second gear stage side), and so it is possible to decelerate based on the driver's will or intention. Further, shift hunting is reduced and the shift feeling is thus improved.

A second embodiment of the present invention differs from the first embodiment described above only with respect to the condition under which the power-off up-shift judgment is canceled. That is, in connection with the second embodiment, when the controller 50 outputs the shift command based on the second shift pattern after the power-off up-shift judgment was performed according to the first shift pattern described in connection with the first embodiment, the condition under which the power-off up-shift judgment is canceled in the second embodiment differs from the condition under which the power-off up-shift judgment is canceled in the first embodiment. In the second embodiment, the controller 50 the controller carrying out the shift control method for the automatic transmission 10, peripheral apparatus, the first shift pattern and the second shift pattern memorized in the controller 50 are the same as in the first embodiment and so a detailed description will not be repeated here.

FIG. 5 illustrates a flowchart showing the shift control method for the automatic transmission 10 in accordance with the second embodiment of the present invention. In this second embodiment illustrated in FIG. 4, the steps S201–S206 are the same as the steps S101–S106 associated with the first embodiment shown in FIG. 4. In addition, the steps S210–S213 in FIG. 5 are the same as the steps S109–S112 in FIG. 4. This an explanation of these steps will not be repeated here.

After it is determined that the power-off up-shift judgment was performed in step S204, and after setting the flag Fup in step S205 and starting the timer T in step S206, the throttle opening θ is memorized in a memory at step S207. The program then proceeds to step S208. In step S208, the controller 50 judges whether or not the vehicle driving condition is the deceleration condition. When it is determined that the vehicle driving condition is the deceleration condition, the program proceeds to step 209 where the controller 50 judges whether or not a rate "V" of the throttle opening θ is less than a predetermined rate "V1". The rate "V" is expressed as the difference in value θ−θ' between the memorized throttle opening "θ" and the throttle opening upon judgment timing "θ'" divided by time T. Thus, the rate "V" which corresponds to the accelerator pedal returning speed by the driver that is expressed as (θ−θ')/T. When it is determined at step S209 that the rate "V" of the throttle opening θ is greater than the predetermined rate "V1", the controller 50 judges that a deceleration is needed for the vehicle as the return speed of the accelerator pedal by the driver is fast. The controller 50 thus cancels the power-off up-shift judgment at step S210 and then outputs a shift command for the electromagnetic valves respectively based on the second shift pattern at step S211.

According to this shift control method, when the driver returns the depressed accelerator pedal quickly, deceleration for the vehicle is needed, and the shift is performed based on the second shift pattern after the power-off up-shift judgment is canceled. The automatic transmission 10 thus does not carry out a shift changing to the high-speed stage side (second gear stage side) and so the deceleration based on the driver's intent is performed. Thus, the occurrence of shift hunting is reduced, and the shift feeling can be improved.

It is to be understood that the present invention is not limited to the details described above in connection with disclosed embodiments. For example, when the deceleration condition of the vehicle is detected, in addition to the use of the throttle opening θ, the deceleration condition may be detected based on several other signals such as using the position of a shift lever or a gear stage. Further, when the shift is performed based on the second shift pattern, the deceleration of the vehicle may be efficiently performed if an ON/OFF control of a lockup clutch in a torque converter and an ON/OFF control of an exhaust brake are performed at the same time. Furthermore, the second shift pattern may be comprised of several sets of shift patterns according to the weight of the vehicle, and the shift control method may be selected from the shift patterns which may be comprised of more than three patterns.

According to the present invention, in the event the driver operates the accelerator pedal to decrease the throttle opening, the vehicle driving condition is changed from the condition shifted according to the first shift pattern to the condition shifted according to the second shift pattern under the prescribed condition. The automatic transmission 10 thus shifts the gear stage based on the second shift pattern without shifting to the high-speed gear stage (second gear stage). In this way, the shift control apparatus is able to more suitably control the automatic transmission according to the driver's intention. Also, it is possible to decrease extra or repeated shifting. Further, hunting by the automatic transmission 10 can be decreased and so the shift feeling is improved.

The principles, various embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control apparatus for effecting shift control of an automatic transmission to shift a gear stage of the automatic transmission comprising:

a first shift pattern in which gear stage shifting is based on vehicle speed and throttle opening;

a second shift pattern in which the gear stage shifting is based on the vehicle speed and a road condition, the gear stage shifting being carried out based on the second shift pattern when the vehicle driving condition is a deceleration condition;

a shift control apparatus which controls the automatic transmission to shift the gear stage based on the second shift pattern without shifting from a first gear stage to a second gear stage, which is a higher-speed gear stage than the first gear stage, when a vehicle driving condition changes from a condition crossing a shift line which commands a shift from the first gear stage to the second gear stage on the first shift pattern to a condition switching from the first shift pattern to the second shift pattern upon occurrence of a prescribed condition.

2. The control apparatus for effecting shift control of an automatic transmission according to claim 1, wherein the prescribed condition is a condition in which the time from the condition crossing the shift line which commands the shift from the first gear stage to the second gear stage on the first shift pattern until the condition switching from the first shift pattern to the second shift pattern is shorter than a predetermined time.

3. The control apparatus for effecting shift control of an automatic transmission according to claim 1, wherein the prescribed condition is a condition in which a rate of the throttle opening is larger than a predetermined rate at a time when the vehicle driving condition changes to a condition in which gear stage shifting is performed according to the second shift pattern within a predetermined time after the vehicle driving condition has crossed over the shift line.

4. The control apparatus for effecting shift control of an automatic transmission according to claim 3, wherein the rate of the throttle opening is proportional to a return speed of an accelerator pedal.

5. The control apparatus for effecting shift control of an automatic transmission according to claim 1, wherein the deceleration condition is a condition in which the throttle opening is less than a predetermined opening.

6. A shift control method for an automatic transmission for shifting a gear stage of the automatic transmission based on one of a first shift pattern in which gear stage shifting is based on vehicle speed and throttle opening and a second shift pattern in which gear stage shifting is based on the vehicle speed and a road condition, with the gear stage shifting being based on the second shift pattern when a vehicle driving condition is in a deceleration condition, comprising:

judging on the basis of the vehicle driving condition whether to perform gear stage shifting according to the first shift pattern or the second shift pattern;

controlling the automatic transmission to shift the gear stage according to the first shift pattern when it is judged on the basis of the vehicle driving condition that gear stage shifting is to be performed according to the first shift pattern;

judging whether the vehicle driving condition changes from a condition crossing a shift line which commands a shift from a first gear stage to a second gear stage on the first shift pattern to a condition switching from the first shift pattern to the second shift pattern; and controlling the automatic transmission to shift the gear stage based on the second shift pattern without shifting from the first gear stage to the second gear stage when a rate of the throttle opening is larger than a predetermined rate at a time when the vehicle driving condition changes to a condition in which gear stage shifting is performed according the second shift pattern within a predetermined time after the vehicle driving condition crossed over the shift line.

7. The automatic transmission shift control method according to claim 6, wherein the shift control apparatus controls the automatic transmission to shift the gear stage based on the second shift pattern when the throttle opening is less than a predetermined opening.

8. The automatic transmission shift control method according to claim 6, wherein when the vehicle driving condition is not the deceleration condition, gear stage shifting is performed according to the first shift pattern.

* * * * *